Figure 1:
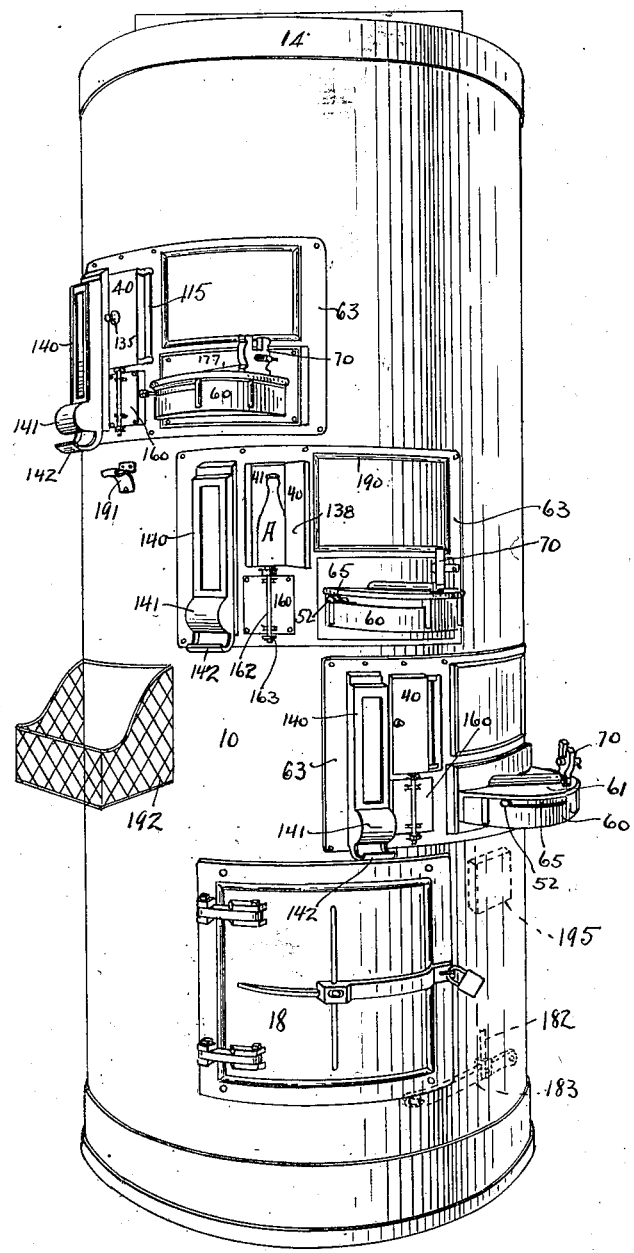

Feb. 20, 1923.

E. H. HOLLAND.
VENDING MACHINE.
FILED NOV. 22, 1918.

1,446,010.

6 SHEETS—SHEET 2.

INVENTOR
Ezekiel H. Holland,
By Baker Macklin,
ATTORNEYS.

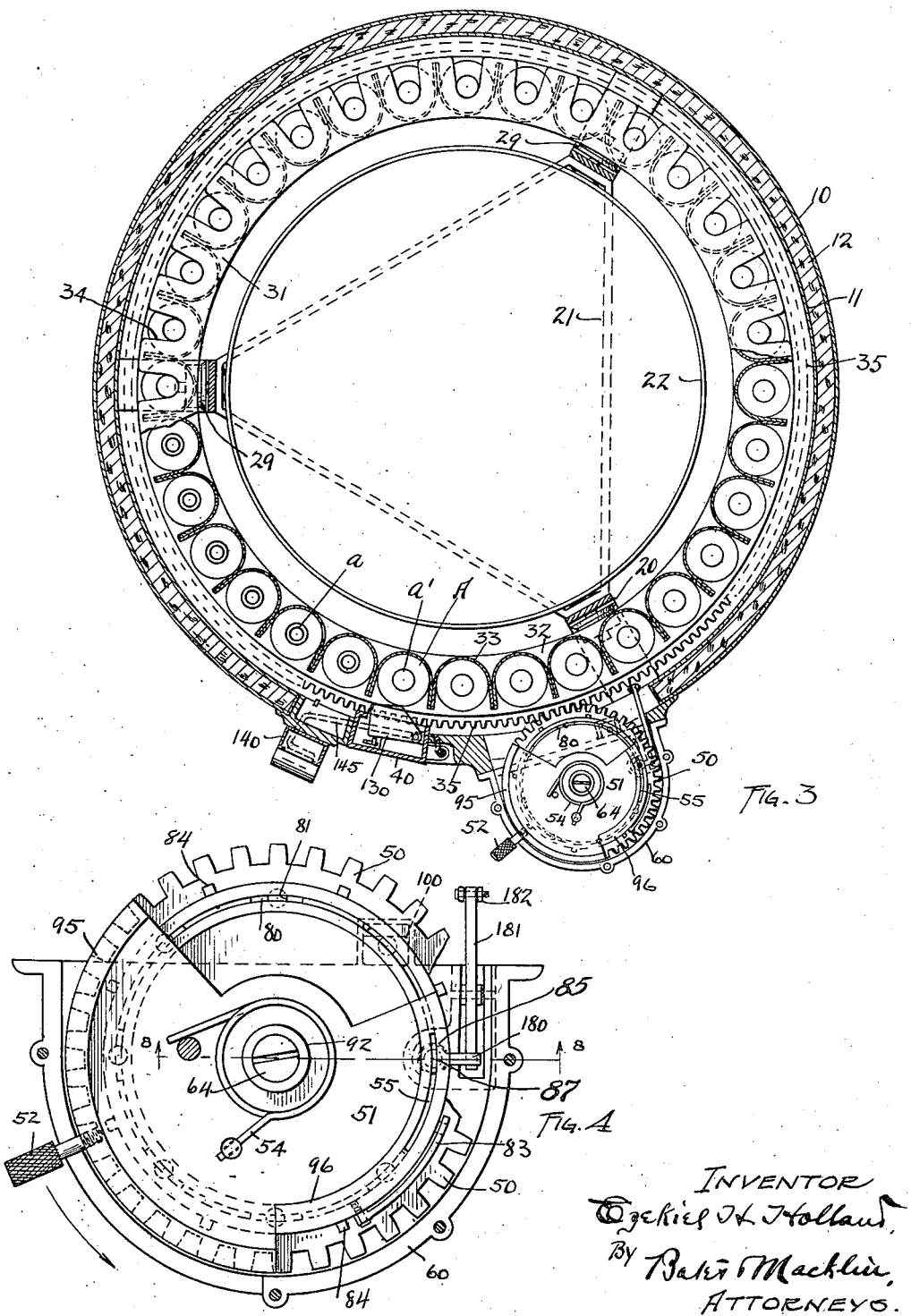

Feb. 20, 1923.
E. H. HOLLAND.
VENDING MACHINE.
FILED NOV. 22, 1918.
1,446,010.
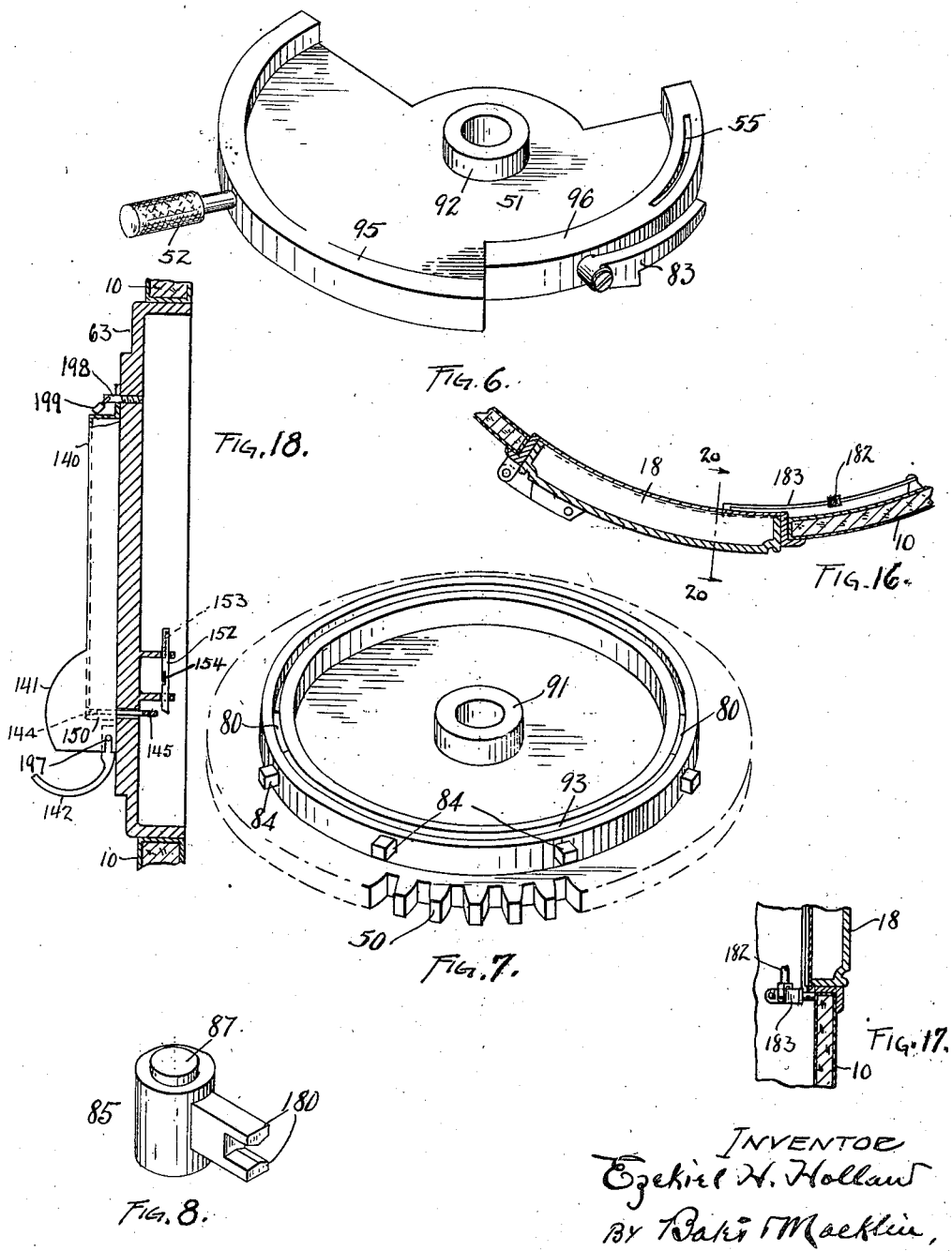

Feb. 20, 1923.
E. H. HOLLAND.
VENDING MACHINE.
FILED NOV. 22, 1918.
1,446,010.
6 SHEETS—SHEET 5.
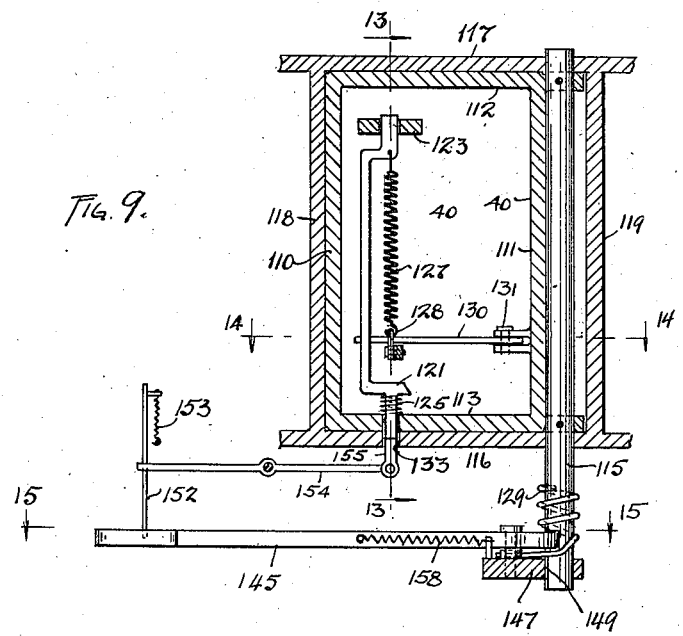
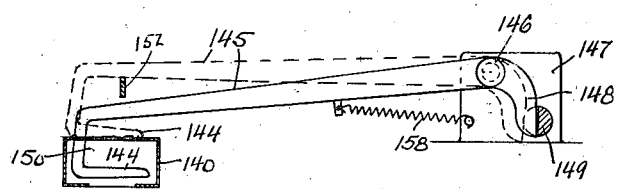
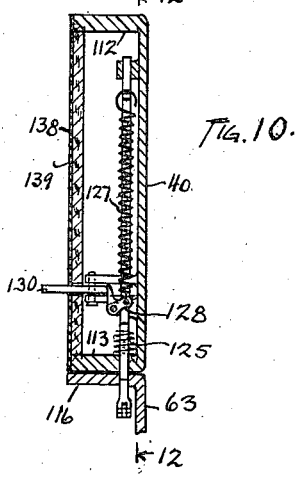
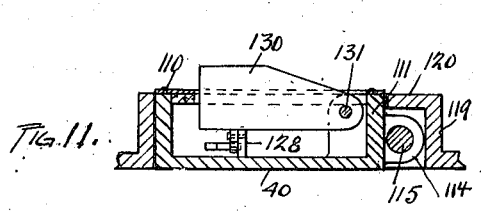
INVENTOR
Ezekiel H. Holland,
By Baker & Macklin
ATTORNEYS.

Feb. 20, 1923.

E. H. HOLLAND.
VENDING MACHINE.
FILED NOV. 22, 1918.

1,446,010.

6 SHEETS—SHEET 6.

INVENTOR
Ezekiel H. Holland,
By Baker Macklin,
ATTORNEYS.

Patented Feb. 20, 1923.

1,446,010

UNITED STATES PATENT OFFICE.

EZEKIEL H. HOLLAND, OF BYRON, GEORGIA.

VENDING MACHINE.

Application filed November 22, 1918. Serial No. 263,647.

*To all whom it may concern:*

Be it known that I, EZEKIEL H. HOLLAND, a citizen of the United States, residing at Byron, in the county of Houston and State of Georgia, have invented a certain new and useful Improvement in Vending Machines, of which the following is a full, clear, and exact description, reference being had to the accompanying drawings.

This invention relates to vending machines, and particularly such machines adapted for dispensing of bottled goods. The invention is well adapted for embodiment in a machine arranged as a refrigerator, so that the goods may be maintained cool.

One of the objects of the invention is to provide simple and efficient means for carrying the goods to be dispensed in a movable row to present them one after another to a suitable doorway through which they may be grasped by hand and directly removed. Another object is to provide such machine in multiple, the different vending units being so arranged as to be readily accessible from different positions, so that more than one purchaser may be served at the same time. In the preferred form of the invention each unit includes an annular carrier made up of outwardly facing pockets, each adapted to house a bottle, this carrier being geared with operating mechanism directly, or which may be rendered operative by the presence of a proper coin. The bottles may be maintained cool by a central ice tank located within the casing and extending within the several carriers. The mechanism illustrated for carrying out these features is included within my invention.

Another feature of the invention is the means for locking and releasing the exit door, which is automatically effected whenever a fresh bottle is presented to the doorway, the door automatically closing itself to preserve the refrigeration as soon as the purchaser, having removed the bottle, releases his hold on the door.

In the dispensing of the bottled goods, the cost of the bottle is a very important item, and it is desirable that some means be employed to practically insure the return of the empty bottles. I accomplish this by providing mechanism adapted to issue a reward, for instance, in the form of a piece of chewing gum, automatically delivered whenever a bottle is returned to the carrier and the door closed. By this means I insure not only the return of the empty bottle but also the maintenance of the door tightly closed until the next vending operation, thus rendering the refrigeration more efficient.

Among the objects of the invention, I may also mention provision for disconnecting the controlling mechanism by the attendant when the machine is about to be replenished; the provision of a storage space within the refrigerator casing for holding a supply of cooled bottles, and mechanism for preventing the closing of the door to this storage space in case any of the vending units are disconnected from their controlling mechanism.

The above mentioned features and others contributing to the efficiency and serviceability of the machine will be hereinafter more fully described in connection with the drawings, which illustrate a preferred form of my invention, and the essential novel features will be summarized in the claims.

Figure 2:
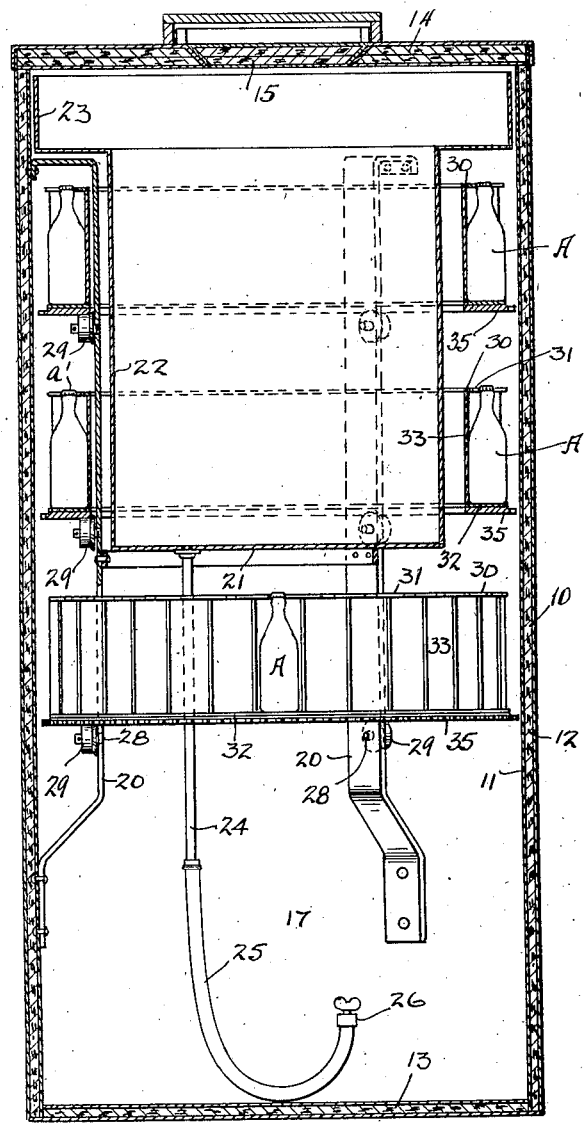
Figure 5:
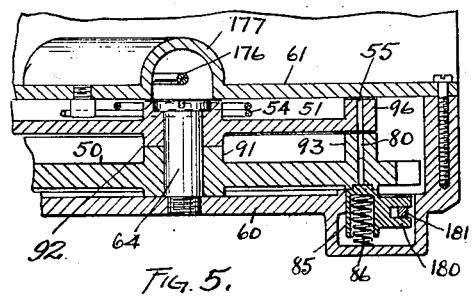
Figure 13:
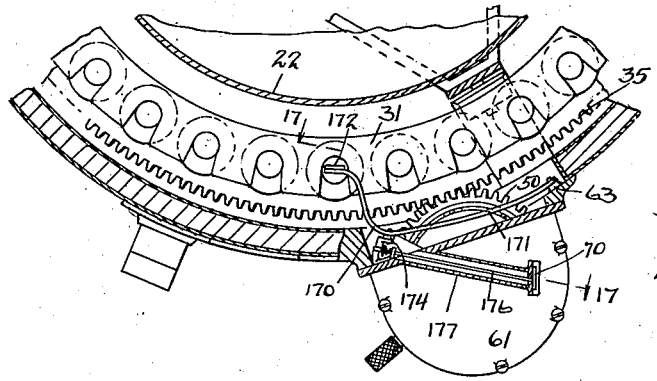
Figure 14:
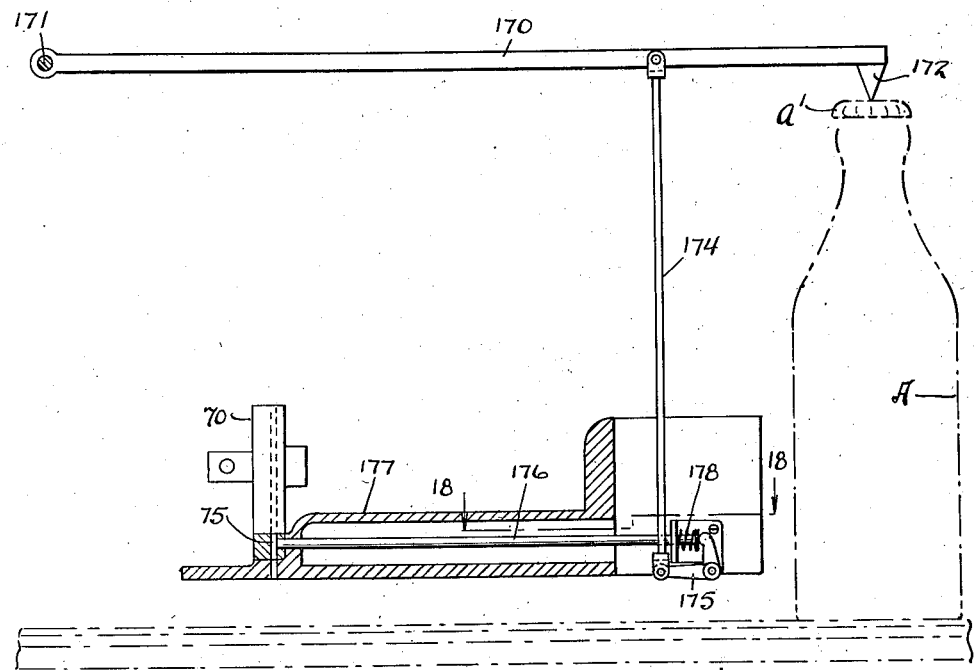
Figure 15:
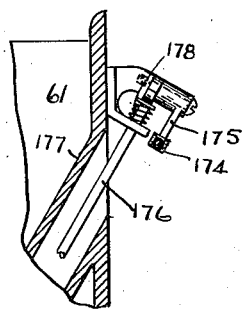

Fig. 1 is a perspective view of one form of the vending machine complete; Fig. 2 is a vertical central section of the machine, the lower carrier, however, being shown in elevation; Fig. 3 is a horizontal section through one of the carriers, part of the carrier being shown in plan; Fig. 4 is an enlarged plan of the carrier operating mechanism; Fig. 5 is a vertical section of the carrier operating mechanism; Figs. 6 and 7 are perspective views of two main members of the carrier operating mechanism; Fig. 8 is a perspective view of the lock for the carrier operating mechanism; Fig. 9 is a vertical section through the door, looking toward the interior of the machine as indicated by the line 9—9 on Fig. 10; Fig. 10 is a vertical section through the door as indicated by the line 10—10 on Fig. 9; Fig. 11 is a horizontal section through the door showing the lock releasing dog, being a section on the line 11—11 of Fig. 12; Fig. 12 is a horizontal section illustrating the gum releasing mechanism being a section on the line 12—12 of Fig. 9; Fig. 13 is a horizontal section through a portion of the carrier and its operating mechanism illustrating the device for preventing insertion of coins when the full bottles of the carrier have been exhausted; Fig. 14 is a diagrammatical sectional elevation illustrating the operation of the mechanism shown in Fig. 13, the general position of the parts being indicated by the line 14—14 on Fig. 13; Fig. 15 is a detail in horizontal section as indicated by the line 15—15 on Fig. 14; Fig. 16 is a fragmentary horizontal section through the storage door; Fig. 17 is a fragmentary vertical section through the storage door, as indicated by the line 17—17 on Fig. 16; Fig. 18 is a vertical section alongside of the casing of the gum carrier.

In Figs. 1, 2 and 3, the casing of the vending machine is shown as comprising a cylindrical upright wall having an outer member 10, an inner member 11 and an intervening suitable heat insulation 12. The bottom 13 of the casing is also provided with an outer member and inner member and intermediate heat insulation. 14 indicates a suitable cover, likewise insulated and preferably provided with a removable portion 15 adapted for the ready insertion of ice to the ice tank without removing the entire cover. The various mechanisms are supported by the inner or outer walls of the casing which thus constitute the frame of the machine.

As shown in Figs. 2 and 3, I secure to the inner casing wall 11 upright bars 20 (three being shown), these bars standing some distance inside of the casing and having their ends bent outwardly and riveted to the casing. These bars are braced by the horizontal triangular frame 21, which supports the ice tank 22, located centrally and shown as having an enlarged upper end 23 extending substantially across the interior of the casing. A suitable drain pipe 24 extends downwardly from the ice tank into the storage space 17 adjacent to the bottom and is preferably provided with an extension hose 25 terminating in a discharge valve 26. 18 in Fig. 1 indicates a suitable door leading to the storage compartment.

Secured to the upright bars 20, and projecting radially outward therefrom, are studs 28 on which are journaled flanged rollers 29. On these rollers are mounted annular carriers 30 for the bottles. The machine shown has three carriers, which I find is a convenient number, though the number may be varied if desired. The carriers are in vertical alignment and each supported by three rollers 29. The ice tank shown overhangs the topmost carrier and extends downwardly within the upper two, which I have found to be a satisfactory arrangement.

The carriers 30 are all preferably alike and interchangeable, for simplicity and cheapness in manufacture. Each of them is shown as consisting of a horizontal top ring 31, a bottom ring 32, U-shaped vertical plates 33 facing outward radially and having their edges abutting each other, as shown in Fig. 3. These U-shaped plates are preferably soldered to each other and to the top and bottom rings 31 and 32, and are of a size to freely embrace the bottles which the machine is designed to carry. The top ring is provided with a suitable outwardly facing notch 34 adapted to expose the bottle cap. I have therefore provided an annular row of outwardly facing bottle pockets, each bottle resting on the ring 32 and standing with its upper end in a notch 34 with the top of its cap approximately flush with the top of the ring 33. These bottles are designated A in Figs. 1, 2 and 3, the upper end or neck $a$, and caps for the tops $a'$.

It will be seen that the bottles are conveniently housed in the pockets of the scalloped carriers, and are normally retained therein by the inner wall of the casing, but may be removed from the carrier through a suitable doorway through the casing. A doorway is provided for each carrier, normally closed by a suitable door. Fig. 1 shows at 40 the upper and lower of these doors closed, while the intermediate door stands open, showing the doorway 41 and the bottle A behind the doorway.

The carriers may be rotated step-by-step to present their bottles to the doorway by the actuation of suitable mechanism. Briefly the mechanism shown for thus rotating the carriers is coin controlled and comprises the large gear 35 secured to the bottom plate 32 of the carrier, a pinion 50 journaled on a vertical axis at the side of the casing and meshing with the gear 35, and a partial disk-like member or segment 51 surrounding and aligning with the gear 50 and provided with an operating handle 52. The segment 51 and the pinion 50 are normally disconnected, but are adapted to be connected by the presence of a proper coin. It will be understood, however, that the coin control feature may be omitted if desired, in which case the segment 51 may be connected directly to the gear 35 and be operated by an attendant or at least under his supervision to dispense the bottles as they are sold.

In the absence of the coin, when the coin controlled feature is employed as shown, the movement of the handle 52 is idle, but when the coin is present, if the handle 52 is swung toward the right in Fig. 3, it turns the pinion 50, which turns the corresponding gear 35 and this moves the carrier. The amount of movement given by each actuation of the handle 52 corresponds to the distance from the center of one pocket to the center of the next, so that every time the carrier is thus actuated a new pocket is presented to the doorway.

Referring now to Figs. 3 and 4, it will be seen that the pinion 50 and segment 51 are contained within a housing 60 having a bottom portion and an arcuate wall and covered by a removable plate 61, the pinion and the segment being journaled on a bolt 64 extending upwardly from the bottom of the housing. The housing 60 may conveniently be secured to a front plate 63 which is secured to the outer casing 10 and, in addition to the housing, carries the door 40, above mentioned, and other parts to be hereinafter described.

The segment 51 is provided with a spring 54 tending to maintain it in the position shown in Figs. 3 and 4, but allowing it to be turned about its axis in the direction indicated by the arrow in Fig. 4. This movement in the embodiment shown is somewhat less than a quarter of a rotation. In the normal position of the segment a slot 55 therein stands below a slot formed in the top plate 61 of the housing. The mechanism is such that when the coin is received in the slot 55 the actuation of the handle 62 causes connection of the member 51 with the pinion 50 for a definite period, so as to turn the carrier to bring the next receptacle into place where it may be removed through the doorway. The slot 55 co-operates with the series of slots 80 in the pinion to effect this operation of the pinion. The pawl 83 co-operates with the lugs 84 on the pinion to operate the same, but as this portion of the mechanism forms no part of the present invention, further detailed description of the operation of these parts is not deemed necessary. A description of a suitable coin controlled means which may be employed to operate the carrier may be found in my co-pending application, Serial No. 365,278, filed March 12, 1920.

The movement of an empty bottle away from the exit door 40 and the presentation of a fresh bottle thereto, when the handle 52 is effectively operated as described operates to unlock the door by mechanism which will now be described, reference being had particularly to Figs. 3, and 9 to 12 inclusive.

The door 40 is shown as a plate having inward flanges 110 and 111 at its upright edges and 112 and 113 at its top and bottom. Adjacent to one edge the door has hinge ears 114 which are pinned to a vertical shaft 115 journaled in the casing forming the doorway. The frame of this doorway may be flanges 116, 117, 118, 119, projecting inwardly from the plate 63 heretofore mentioned. These flanges coact with the edge flanges of the door to make a close connection at the swinging edges of the door to assist in preserving the internal refrigeration. For the same reason the flange 119 continues behind the ears 114 and the shaft 115, as shown at 120 in Fig. 11. The door is preferably provided with an inner face plate 138 secured to its flanges and internally backed by a plate 139 of heat insulating material.

The door is normally latched closed by means of the latch 121 slidably journaled in the bottom flange 113 of the door and an ear 123 formed on the door. A spring 125 surrounding the latch tends to elevate it but it is normally held down in the position shown in Figs. 9 and 10 by a stronger spring 127 which is anchored at its upper end to the latch and at its lower end to one arm of a bell crank 128. The other arm of this bell crank bears against a dog 130 pivoted at 131 to the door and normally bearing against the side of the bottle which is directly behind the door, as shown in Fig. 3.

When the carrier is operated by the handle 52 the bottle which was engaging the dog 130 clears it and this dog is free to swing inwardly into the space between the bottle surface and the edge of the pocket 33. The spring 127 causes it to swing whereby the lower arm of the bell crank 128 rises and the spring 125 thereupon elevates this latch sufficiently to raise the lower end thereof above the flange 116 of the door frame. This unlatches the door, and, when unlatched, the further contraction of the spring 127 swings the door slightly forward, to carry the latch 121 in front of the keeper recess 133. The door is now released and may readily be entirely opened by the purchaser taking hold of the knob 135. When the door is swung by this knob into the position shown for the intermediate door in Fig. 1, the bottle is exposed and may readily be removed by hand.

A spring 129 coiled around the shaft 115 tends to swing the door closed, and this operation takes place as soon as the purchaser has removed the bottle and released his hold on the door knob. There is, therefore no material loss of refrigeration through the doorway when the machine is manipulated.

To make it to the advantage of the purchaser to return the bottle, I provide a subsidiary vending mechanism automatically actuated by the return of the bottle to the carrier and the subsequent closing of the door. This mechanism is shown in Figs. 9, 12 and 18. 140 indicates a suitable casing adapted to carry a pile of pieces, for instance, of gum; 141 a recessed portion at the front of the casing to provide space for the ejection of the bottom piece; and 142 a suitable support to receive the ejected piece. The pile of gum rests on the bent end 144 of an arm 145 pivoted at 146 to a stationary ear 147 of the front plate 63, and having a toe 148 bearing against a flattened portion 149 of the shaft 115.

When the shaft 115 is turned by opening the door to remove the fresh bottle, the arm 145 is swung into the position shown in dotted lines in Fig. 12. When in the latter position the pile of gum is cleared so that the whole pile drops onto a bottom plate 150, Figs 12 and 18, which is directly below the path of the end 144 of the arm. As the arm comes into its withdrawn position it passes beneath and is retained by a latch 152 which is held in front of it by a spring 153. This latch bar is connected by an intermediate pivoted lever 154 with a plunger 155 which extends into the keeper recess 133 and is adapted to be abutted by the end of the latch 121 when the door is closed.

It follows from the above described mechanism that the opening of the door withdraws the arm 145 and allows the gum to drop, to bring the bottommost piece in front of its finger 144. The subsequent closing of the door has no effect unless a bottle is present, but after a bottle has been returned to the carrier then the closing of the door causes the dog 130 to strike against the side of such empty bottle and operate the bell crank 128 to constrain the spring 127 to pull down the latch bar 121 as soon as the lower end comes into registration with the keeper recess 133.

The pulling down of the latch bar, by the closing of the door against the empty bottle, not only locks the door closed, but also shoves downwardly on the plunger 155 which raises the latch 152, and releases the arm 145 from the position shown in dotted lines in Fig. 12. Thereupon the spring 158 acting on this arm swings it forwardly and the finger 144 of the arm shoves out to the front the lowermost piece of gum. This piece comes out within the forwardly bulged portion 141 of the casing and then drops into the receiving pocket 142.

The casing for the gum carrier may be of any suitable form. A convenient construction is illustrated in Fig. 18, wherein the casing is removable from the front, being provided at its lower end with slots extending over stationary pins 197 and at its upper end over a pin 198 which carries a suitable padlock 199. 160 in Fig. 1 illustrates a cover plate over an opening through which access may be had to the gum vending mechanism. This cover plate is shown as normally retained by a pin 162 which may be held by a cotter pin 163 but may be readily removed when the door is open.

When the coin control feature is employed I provide means for preventing the deposit of a coin should the corresponding carrier be empty. The means for this purpose is best shown in Figs. 13, 14 and 15 and will now be described, it being understood that Fig 14 is a somewhat diagrammatic view for clearness of illustration.

170 indicates a lever suitably pivoted at 171 to the inner face of the plate 63 and having at its other end a downwardly extending prong or toe 172 adapted to engage the top face of the carrier ring 31 as well as the tops of the caps $a'$ on the bottles in the carrier, this toe being positioned so that as the carrier ring slides out from under the toe, the cap on the bottle engages the toe, as shown in Figs. 13 and 14. Extending downwardly from the lever 170 is a link 174, the lower end of which is connected with a bell crank 175. The other arm of this bell crank bears against a rod 176, housed in a projecting portion 177 of the top plate 61 of the housing 60. The extreme end of the rod 176 occupies a horizontal hole in the base of the coin detector and normally stands just behind the discharge slot 75 of the coin detector 70. Ordinarily the rod 176 is idle, the engagement of the toe 172 with the carrier or bottle cap holding the bell crank 175 in the position shown in Fig. 14, and the spring 178 around the rod 176 maintaining it abutting the bell crank arm and clearing the slot 75 as shown in Fig. 14.

The machine is originally loaded with a bottle in each pocket of the carrier. As the toe 172 engages the bottle next to the right of the one registering with the door and as the movement of the carrier is in a right hand direction of rotation, Fig. 3, it follows that as each bottle is removed and either replaced, or the carrier advanced without replacing it, a fresh bottle to the right of the last removed one will be presented to the door, and the toe 172 will continuously engage the caps of filled bottles, until the pocket which was first emptied has traveled nearly around the circuit. As the last full pocket comes opposite the doorway this first pocket will have then come around into registration with the toe 172, and whether the pocket is entirely emptied or simply contains an empty bottle the result will be the same, namely, there will be nothing in the pocket adapted to engage the toe 172 and raise the lever 170. Therefore the weight of this lever (having greater force than the light spring 178) will depress it, swinging the bell crank 175 and shoving in the rod 176 so that its outer end extends across the discharge slot 75 of the coin detector. This prevents any coin dropping from the detector into the discharge slot thereof, and therefore any coin deposited in the detector mouth will remain in the disk 71 and be returned to the user when he removes his fingers from the handle 73 and the spring of the detector turns the disk back.

To enable the carrier to be freely turned by the attendant, for removing the empty bottles and inserting fresh ones, I provide a mechanism for holding idle the locks on the operating pinions 50, this mechanism being within the casing and accessible when the door 18 is open. This mechanism is illustrated particularly in Figs. 1, 5, 8, 16 and 17. The plunger 85, which is normally held elevated by the spring 86, in engagement with the operating pinion 50, has two projecting jaws 180 between which extends a lever 181 pivoted intermediately and having its other end connected by a link 182 with a hand lever 183. This hand lever is pivoted to the inner side of the casing in a position readily accessible when the door 18 is open. Ordinarily this hand lever and the linking system is idle, the springs 86 operating the plungers. However, whenever desired, the attendant, by opening the door 18 may pull up on the hand lever 183 and hook it on a suitable projection (preferably the door sill, as hereinafter explained), maintaining it elevated. By so doing he draws down the plungers 85 and holds them in idle position so that the pinions 50 and the carriers are free to rotate. The attendant then operates the handle 52 successively to rotate the carrier step by step; at the same time taking out the empty bottles and putting in filled bottles, which have been cooled by having been deposited in the storage space.

The hand lever 183 is preferably located near the lower edge of the door 18 in such a position that when it is operated to withdraw the plungers it projects into the doorway, the sill of the doorway forming the projection to hold it in its elevated position. This makes a slight obstruction to the closing of the door and prevents the attendant finishing his replenishing of the machine and forgetting to restore the pinion locks, for the obstruction to the closing of the storage door 18 would advise him of the situation. If desired, the complete closing of the door may automatically shove the handle 183 off of the door ledge, and release the plungers 85, which would be automatically restored by their springs 86.

When the attendant has the door 18 open he may readily drain the ice tank by passing the end of the rubber hose 25 out through the doorway and opening the valve 26. In the preferred system of operation the attendant on his periodic calls removes the empty bottles from the various carriers, opens the door 18 and resupplies the carriers with cool bottles from the storage space, puts a fresh supply of bottles into the storage space, drains the ice tank through the discharge hose 25 and replenishes the tank with ice.

In the manipulation of my machine having the coin control feature, a coin is deposited in the mouth piece of the coin detector, and the coin detector handle given a half turn. Then, unless the coin is returned by the detector, as would result if the coin were faulty or the carrier empty, the purchaser takes hold of the lever 52 and swings it throughout its stroke toward the right. This brings a fresh bottle opposite the corresponding doorway and unlatches the door, which swings slightly open. Then the purchaser takes hold of the knob and pulls the door entirely open and removes the bottle, the door swinging to closed position automatically when released.

I may provide a suitable device to enable the cap of the bottle to be conveniently removed, such a device being illustrated at 191 in Fig. 1. Beneath this is a suitable receptacle 192 to catch the caps. The empty bottle may be deposited in this unless the purchaser, as is usual, wishes to obtain the piece of gum which is issued upon return of the empty bottle. If he does wish such gum he opens the unlatched door, returns the empty bottle and closes the door tight. Thereupon the machine issues the gum which falls down into the pocket 142.

Fig. 1 shows three vending units in the machine. To enable these or any other plural number of units to be operated at the same time by different purchasers I arrange the operating and discharging mechanisms in different positions for the different carriers. The plates 63 form the supports of these mechanisms, being preferably located in echelon, as shown in Fig. 1. It is convenient to make the casing of sheet metal, as described, and to mount on the plates 63 the housing for the operating pinion and segment, the gum carrier, the cover allowing access to its interior and the door and its mechanism. The space on the plate 63 above the pinion and segment housing furnishes a convenient place for displaying suitable instructions, as indicated by the frame 190 in Fig. 1.

It will be seen from the above description that my machine is simple in construction; that it may be easily operated to dispense bottles one after the other; that the return of the bottles is practically assured by reason of the gum reward; and the contents of the bottles are maintained cool by reason of the refrigeration features. The keeping of a stored supply of bottles in the storage compartment insures cool bottles being dispensed even though the machine has been freshly charged by the attendant. The supplying of ice and the draining of the ice receptacle is very conviently effected. As a result of the various features I have devised, a machine is produced which, with the practical minimum of attention, will operate automatically to dispense cooled bottled beverages.

While the arrangement of the parts and the mechanisms shown has been found advantageous in practice, it is to be understood that I do not intend to limit myself to the particular form shown, as many modifications and mechanical equivalents may be employed within the spirit of my invention.

Having thus described my invention what I claim is:—

1. The combination of a casing, a set of carriers therein adapted to contain articles to be vended, a storage compartment in the casing below the carriers, said storage compartment having a doorway and door, individual mechanism for operating the carriers, individual locks for said mechanism releasable independently of each other, mechanism within the casing to release the locks independently of the first named mechanism, said mechanism having an operating device adapted when operated to project into the doorway.

2. The combination of a casing, an exit doorway, a carrier within the casing adapted to present bottles successively to the doorway, a door in said doorway, a latch for holding said door closed, and a member connected to said latch and positioned by a bottle in said carrier, movement of said member from one position causing motion of the latch to unfasten the door.

3. The combination of a casing, a carrier therein having a row of outwardly facing pockets adapted to contain bottles, a doorway into the casing opposite the carrier, a door for said doorway having latching mechanism adapted to be engaged and actuated by the bottles in the carrier.

4. The combination of a casing, a carrier therein, having pockets for bottles, a door for closing a doorway through the casing, a latch for the door, and a controlling dog for the latch adapted to engage a bottle in a carrier pocket to place the latch in locking position.

5. The combination of a casing, a carrier therein adapted to contain articles to be vended, a door adapted to close a doorway through the casing, registering with the carrier, a latch for said door, a pivoted dog carried by the door and adapted to engage the side of a bottle in the carrier, and connecting mechanism between said dog and said latch whereby the latch releases the door when a bottle occupies a predetermined position.

6. The combination of a casing, a carrier therein adapted to contain bottles to be vended, a doorway through the casing, a door in the doorway, a latch for holding the door closed, and a member connected to said latch, means for causing said member to bear against a bottle behind said doorway, whereby movement of the bottle away from said doorway allows opening of the door.

7. The combination of a casing having a door and doorway, a spring tending to close the door, a carrier within the casing adapted to present bottles to the doorway, a latch for the door, mechanism whereby the latch is withdrawn when a bottle is moved away from the door, and means whereby the subsequent presentation of a bottle to the door moves the door to unlatching position.

8. The combination of a casing having a doorway therein, a door for said casing, mechanism for unlatching the door, and a supplementary vending machine controlled by the return of an article through the doorway and the closing of the door, mechanism for exercising said control and including a member adapted to cooperate with said bottle when the door is closed.

9. The combination of a casing, having a doorway, a carrier within the casing, adapted to contain articles to be vended, a door for the doorway adapted to be latched, mechanism for moving the carrier and unlatching the door, and a supplemental vending machine controlled by the replacement of an article in the carrier through the doorway and the subsequent closing of the door, said control including a member adapted to abut said article when the door is closed to allow latching of the door and the actuation of the supplementary vending machine.

10. The combination of a casing, a movable carrier therein, adapted to contain bottles, mechanism for moving the carrier, a door in the casing, latching mechanism for the door adapted to maintain it closed but automatically release it when the carrier is operated, and a supplemental vending machine operable by means of the action of a bottle returned to the carrier on said door-latching mechanism when the door is closed.

11. The combination of a casing, a carrier therein adapted to contain articles to be vended, a doorway through the casing provided with a door, a supplementary vending unit, discharge mechanism therefor, set by the movement of the door, and released by engagement of mechanism with an article returned to the carrier through the doorway.

12. The combination of a casing, a bottle carrier therein, mechanism for moving the carrier, a doorway through the casing, a door for said doorway, a latch for the door, adapted to engage a bottle in the carrier and rendered active by such engagement, whereby the door is unlatched as the bottle moves away from the door and a fresh bottle moves to it, and a supplementary vending machine, the operating mechanism of which is set by the movement of the door and released for action by the closing of the door consequent upon the latch thereof engaging a bottle.

13. In a vending machine, the combination of a casing having a door therein, mechanism for unlatching the door to permit a commodity to be dispensed, an auxiliary dispensing mechanism, a mechanism for actuating said dispensing mechanism by the return to the carrier of the container of the commodity first dispensed and having a member moved by contact with said container to actuate the dispensing mechanism.

14. In combination, a casing, a carrier therein, adapted to contain articles to be vended, a doorway through the casing provided with a door, refunding mechanism, and actuating means therefor, operating mechanism for the actuating means, said last mentioned mechanism being associated with the door and adapted to contact with an article returned through the doorway.

15. The combination of a casing, a bottle carrier therein, mechanism for moving the carrier, a doorway through the casing, and a door therefor, a latch for the door adapted to engage a bottle in the carrier and rendered active by such engagement whereby the door is unlatched as the bottle moves away from the door and a fresh bottle moves to it, and means for dispensing a reward article, the operating mechanism of which is set by the movement of the door and released for action by the closing of the door consequent upon the latch thereof engaging a bottle.

16. The combination of a casing having a doorway and door, a carrier within the casing adapted to contain bottled goods, mechanism for moving the carrier and unlatching the door to allow a bottle to be removed, a gum vending machine, means actuated by the latching of the door when the bottle has been returned to place and including a member moved by the returned bottle to actuate the gum vending machine upon the subsequent latching of the door, the casing for the gum vending machine being on the exterior of the casing first mentioned.

In testimony whereof, I hereunto affix my signature.

EZEKIEL H. HOLLAND.